United States Patent Office 3,338,597
Patented Aug. 29, 1967

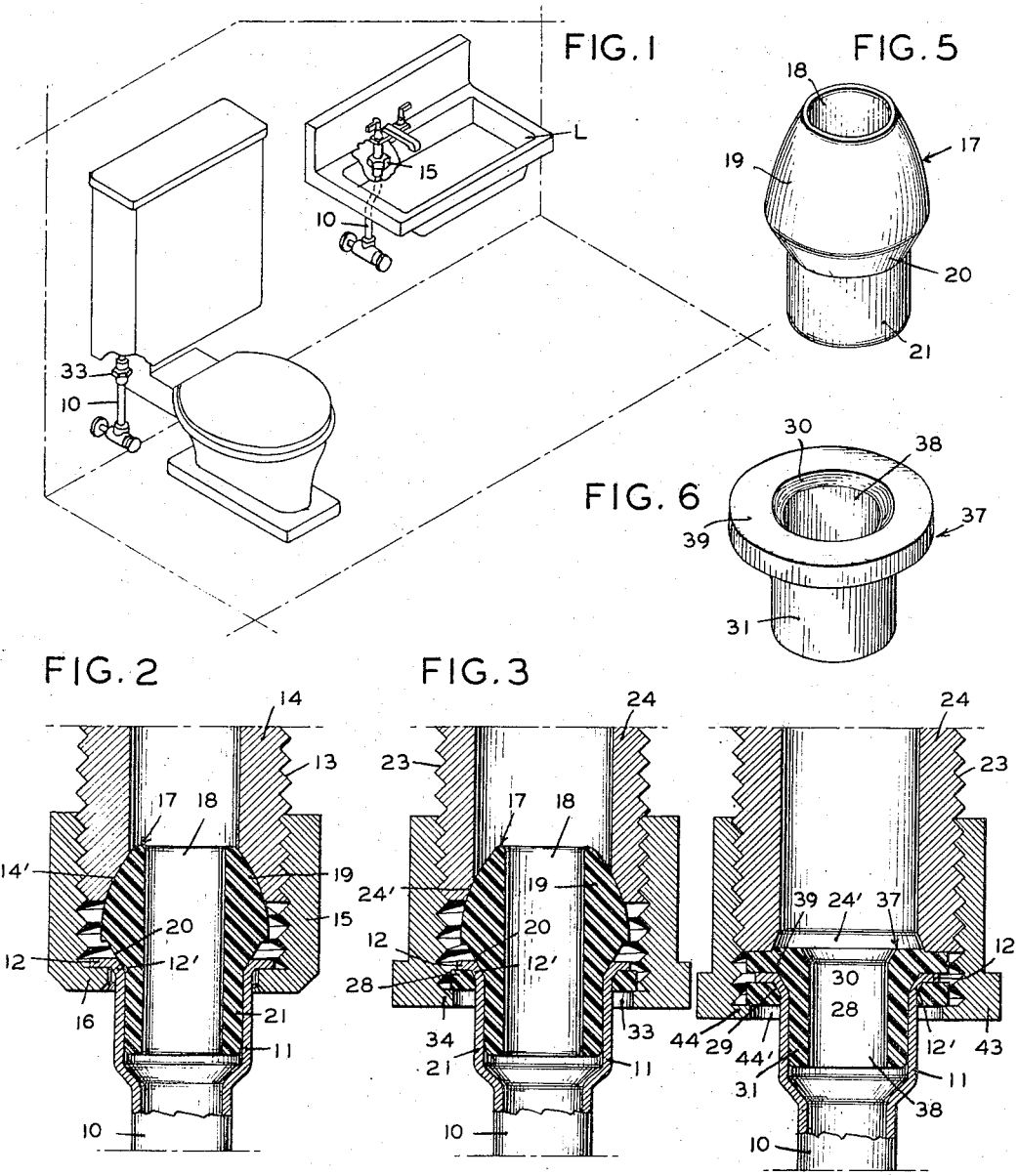

3,338,597
SUPPLY TUBE ADAPTERS NARROW SUPPLY TUBE-NARROW INLET
Richard A. Mason, Orange, Conn., assignor to National Distillers and Chemical Corporation, New York, N.Y., a corporation of Virginia
Filed Oct. 13, 1966, Ser. No. 586,552
4 Claims. (Cl. 285—52)

This invention relates to novel pipe joints or connections and more particularly to such connections where, in addition to the creation of a fluid tight joint, the avoidance of a metal-to-metal assembly is highly desirable.

The present application is a continuation-in-part of application Ser. No. 566,831, and Ser. No. 566,820, both filed July 21, 1966, which are divisions of application Ser. No. 314,061; all three cases are now abandoned.

One field in which the invention has particular utility is in connection with the attachment of water supply connections to lavatories and to toilet tanks. In present-day practice it is conventional to provide a relatively soft copper inlet tube, usually chrome-plated for decorative purposes, to effect a water-tight union between the standard water supply connections and the lavatory fixtures.

These water inlets are of differing structural characteristics and sizes, different problems of assembly existing a between lavatories and toilet tanks; thus any attempt at utilization of identically constructed water supply pipes or tubes for attachment to these fixtures provides insurmountable installation problems.

It is a major purpose if the present invention to provide novel adapters which will function as washers or gaskets to fit conventional or standard water inlets to lavatory fixtures.

It is a further object of the invention to provide novel plastic adapters whereby two pipe fittings may be connected readily to provide a fluid-tight joint therebetween.

A further object of the invention is to provide novel plastic adapters whereby an identical inlet supply may be fitted to either the conventional smaller fitting of a lavatory or the conventional larger fitting of the toilet type.

A still further object of the invention is to provide inlet tubes or supply pipes having novel formed extremities whereby fluid-tight joints or connections with lavatory or toilet tank fixtures having different internal and external diameters may be accomplished with particular facility.

Further objects and advantages of the invention will be apparent from the following description taken in connection with the accompanying drawing wherein:

FIGURE 1 is a perspective view illustrating, somewhat diagrammatically, the utilization of the present invention with a lavatory and with a toilet tank assembly.

FIGURE 2 is a longitudinal sectional view, on an enlarged scale, illustrating a fluid tight joint in accordance with the present invention between the supply tube or pipe and the faucet inlet of a lavatory.

FIGURE 3 is a longitudinal sectional view, similar to FIGURE 3, illustrating a fluid tight joint in accordance with the present invention between the supply tube or pipe and the inlet connection of a toilet tank, utilizing a backup washer in connection therewith.

FIGURE 4 is a longitudinal sectional view, also on an enlarged scale and similar to FIGURE 2, illustrating a fluid tight joint in accordance with the present invention between the supply tube or pipe and the inlet connection of a toilet tank, utilizing a slightly modified form of adapter.

FIGURE 5 is a perspective view of the adapter shown in FIGURES 2 and 3.

FIGURE 6 is a perspective view of the adapter shown in FIGURE 4, and

FIGURE 7 is a perspective view of a back-up washer utilized with the adapter shown in FIGURES 2 and 4 whereby all metal-to-metal contact in the joint, other than threaded engagement, is avoided.

As shown in the drawing, the water supply tube or pipe 10, desirably inherently flexible and produced from chrome-plated copper, includes a formed extremity 11 having an internal diameter greater than that of the inlet or supply pipe 10, this formed extremity terminating in an outwardly directed peripheral flange 12. The flange 12 extends outwardly in a plane substantially perpendicular to the axis of the pipe 10 and meets the formed extremity 11 at a flattened junction portion 12' which is angularly inclined for a purpose to be described more fully hereafter, it being understood that the material of the pipe 10 is not deformable under the pressures exerted in the creation of a fluid tight joint.

This formed extremity 11, and flange 12, is of a size, or exterior diameter, approximating that of the exteriorly threaded extremity 13 of the faucet inlet pipe 14 of the lavatory L and an internally threaded basin nut 15, of conventional design and including an inwardly directed flange 16, is provided to connect the supply tube 10 to the faucet inlet pipe 14.

An adapter 17 is provided, so constructed that pressure applied by the basin nut will insure water tight joints at the lavatory inlet and at the flanged outlet extremity of the copper supply tube. Desirably, this adapter is produced from material deformable under pressure and certain of the polymerized olefins, and polyethylene in particular, have been found to be especially suitable for present purposes.

As illustrated more particularly in FIGURES 2, 3 and 5 of the drawing, the adapter 17 is axially apertured as at 18 and includes an enlarged and spherical head portion 19 which merges, by reason of an inwardly tapered intermediate or neck portion 20 into a depending sleeve portion 21 having a cylindrical peripheral surface of a diameter closely approximating the interior diameter of the formed extremity 11 of the the supply pipe 10. The angular inclination of the neck portion 20 is complementary to the flattened junction portion 12' of the formed extremity 11 to provide for snug engagement therebetween when a fluid tight joint is created.

In assembly, the sleeve portion 21 of the adapter is positioned within the formed extremity 11 of the supply tube 10 with the neck portion 20 engaging the flattened junction portion 12' between the formed extremity 11 and the flange 12. As noted hereabove, the neck portion 20 and the junction portion 12' are inclined at the same angle, thereby insuring a water-tight seal between the formed extremity 11 and the adapter 17.

The spherical head portion 19 is positioned against the extremity of the faucet inlet pipe 14, which may be tapered of such purpose as indicated at 14', and pressure applied to the adapter through the tightening of the basin nut 15 will result in water-tight joints both at the lavatory inlet and at the interface between the neck portion 20 of the adapter and the junction portion 12' of the supply tube.

Since the head portion 19 is deformable when the basin nut 15 is tightened, the water-tight seal between the head portion and the faucet inlet 14 is formed more readily since the extremity of the inlet pipe 14 presses into the head 19. Similarly, the junction portion 12' is pressed into the neck portion 20 of the adapter head 19 when the basin nut is tightened, thereby insuring a water-tight seal with the application of lesser pressure than would be required if the adapter were not produced from a deformable material.

Consideration being given to the several and separable components of the fluid tight joint under consideration, reference being had to the supply pipe 10, the receiving pipe 14, the basin nut 15 and the adapter 17, each of these has a longitudinal axis and when the basin nut is operated to draw the supply pipe toward the receiving pipe these longitudinal axes become substantially coaxial as the adapter deforms into sealing relationship with the flange 12 on the formed extremity of the supply pipe.

Moreover, with the adapter of the present invention, the metal-to-metal joint common to the industry has been eliminated, a plastic-to-metal joint being provided except insofar as threaded engagement between the basin nut 15 and the receiving pipe is concerned. Accordingly, with the formed extremity of the metal supply pipe isolated from the faucet inlet through utilization of plastic sound-deadening material, transmission of water noise from the service line is substantially eliminated.

There has been illustrated in FIGURE 3 of the drawings a fluid tight connection between a water supply tube or pipe 10 and the exteriorly threaded extremity 23 of a toilet tank inlet fitting 24 utilizing the identical adapter 17 described hereabove. It will be noted that the inlet and interior diameters of the conventional tank fitting 24 are of greater diameter than those of the lavatory inlet fitting 14 and that the aperture 33′ in the toilet tank nut 33 is of a sufficient size to permit passage therethrough of the flange 12 of the water supply pipe 10.

As illustrated, the water supply pipe 10 and adapter 17 and the relationship therebetween are identical to that described hereabove in connection with the fluid tight lavatory fitting shown in FIGURE 2 of the drawing and no additional discussion thereof is believed necessary; further, the lower extremity of the tank inlet pipe 24 may be tapered as indicated at 24′ for appropriate sealing engagement with the spherical head portion 19 of the adapter.

To provide for a fluid tight seal beneath the flange 12 of the water supply tube 11 and the inwardly directed flange 34 of the tank nut 33, an outside washer or gasket 28 is provided, this washer fitting snugly about the formed extremity 11 of the supply tube and being provided with a cut-away or tapered portion 29 on the inner periphery thereof, the angular relationship being complementary to the flattened junction portion 12′ of the formed extremity, to permit of convenient assembly in completely flush contact with the lower surface of the peripheral flange 12. It will be understood that this outside washer also is produced from materials which are deformable under pressure, similar to those suggested hereabove in connection with the adapter 17 as suitable for present purposes.

Tightening of the tank nut 33 transmits pressure to the outside washer 28, the flange 12 on the water supply tube, and the head portion 19 of the adapter directly against the lower extremity of the tank inlet fitting, thus creating a water tight joint between the supply tube and the tank inlet. Here there is complete elimination of metal-to-metal contact and, through use of plastic sound deadening materials, transmission of water noise from the service line is substantially eliminated. Moreover, the smaller diameter flange of the water supply pipe or tube, designed to fit conventional lavatory fittings, can be utilized with particular convenience to fit and provide a water tight joint with the larger diameter fitting of the toilet tank.

It will be understood that, if desired, the outside washer 28 also can be utilized in connection with the lavatory fitting illustrated in FIGURE 2 of the drawing and will, from the point of view of secondary sealing and further sound deadening, enhance the efficiency thereof.

Utilizing an identically formed inlet supply tube or pipe, a modified form of the invention has been illustrated in FIGURES 4 and 6 of the drawing for making connection to the toilet tank where the tank inlet fitting 24, externally threaded as indicated at 23, is of greater interior and exterior diameter than the lavatory inlet 14.

As illustrated, this modified form of adapter 37 includes a head portion 39 constituted by an outwardly extending flange portion having an exterior diameter somewhat greater than that of the peripheral flange 12 of the supply tube and slightly less than that of the threaded extremity 23 of the tank inlet fitting.

The adapter 37 is axially apertured as indicated at 38 and includes a depending sleeve portion 31, having a cylindrical peripheral surface of a diameter closely approximating the interior diameter of the formed extremity 11 of the supply pipe and comparable to the sleeve portion 21 of the adapter 17 described hereabove, the head portion 39 merging into the sleeve portion by an inwardly tapered neck portion 30, the angular relationship being complementary to that of the flattened junction portion 12′ of the formed extremity on the supply pipe. With this form of adapter, the outside washer 28 is employed, this washer fitting snugly about the formed extremity 11 of the supply tube and, desirably, being provided with a cut-away or tapered portion 29 on the inner periphery thereof, complementary to the inwardly tapered neck portion 12′ of the supply pipe, to permit of convenient assembly in completely flush contact with the lower surface of the peripheral flange 12. It will be understood that the adapter 37 and outside washer 28 are produced from materials which are deformable under pressure, certain of the polymerized olefins, and polyethylene in particular, being admirably suitable for present purposes.

In assembly, the sleeve portion 31 of the adapter 37 is inserted within the formed extremity 11 of the supply tube and the outside washer 28 is positioned upon said formed extremity, flush engagement being secured as between the head portion 39 of the adapter, the peripheral flange 12, and said outside washer. The toilet tank nut 43, of conventional design and having an inwardly directed flange 44, is then positioned in surrounding relationship with respect to the formed extremity of the supply tube and the entire assembly is moved into position for threaded engagement between the toilet tank nut and the tank inlet fitting, the external diameter of the peripheral flange 12 being slightly less than the diameter of the aperture 44′ of the inwardly directed flange 44 of the tank nut.

Tightening of the tank nut transmits pressure to the outside washer 28, the flange 12 on the inlet tube, and the head portion 39 of the adapter directly against the extremity of the tank inlet fitting 24, thus creating a water tight joint between the supply tube and the tank inlet. It will be observed that with the two-part adapter thus described, the metal-to-metal joint common to the industry has been eliminated, a plastic-to-metal joint being provided except insofar as threaded engagement between the tank nut and the inlet fitting is concerned. Another advantage of the novel joint thus described is that with the formed extremity of the metal inlet tube 10 isolated from the toilet tank inlet through utilization of a plastic deadening material, transmission of water noise from the service line is substantially eliminated. Moreover, the smaller diameter flange of the supply tube, designed to fit conventional lavatory inlet fittings, can be utilized with particular convenience to fit and provide a water tight joint with the larger diameter fitting of the toilet tank.

It will be obvious that this modified form of adapter can be used with equal facility in connection with a lavatory inlet fitting, as illustrated in FIGURE 2 of the drawing, with or without the outside gasket or washer 28.

In practice, with the utilization of the present invention, it has been discovered that the resilient plastic materials contemplated will provide for tighter and longer lasting joints which can be assembled and disconnected with particular ease and little likelihood of damage to the adapters. Moreover, where for any reason replacement of an adapter is desired, this also may be accomplished with particular facility.

There has thus been described novel fluid-tight joints where a supply tube may be connected to pipes for fixtures of varying diameter. Since various changes may be made in the invention, without departing from the spirit and scope thereof, the invention is not considered limited by that which is shown in the drawing and described in the specification, and reference is therefore had to the claims for summaries of the novel features of construction and novel combinations of parts for all of which protection is desired.

What is claimed is:

1. A joint for connecting a fluid supply pipe to a fluid receiving pipe, comprising:
 a formed extremity on said supply pipe, an adapter and at tightening means;
 said supply pipe having an end, a first longitudinal axis and a first aperture through it along said first longitudinal axis;
 said formed extremity being adjacent the said end of said supply pipe; said supply pipe having a first interior diameter substantially along its entire length; said formed extremity having a second interior diameter greater than said first diameter; a tapered portion of said supply pipe joining said supply pipe with said formed extremity;
 a flattened junction portion at said end of said supply pipe which is inclined at a first acute angle from said first longitudinal axis;
 a flange extending generally perpendicular to said first longitudinal axis and meeting said supply pipe at said junction portion;
 said formed extremity and said flange being composed of a rigid material;
 said receiving pipe having an adapter seating surface at its end, a second longitudinal axis, a second aperture through it along said second longitudinal axis and an exterior surface which is threaded near its said end;
 said tightening means having a third longitudinal axis, a third aperture therethrough along said third axis, a second flange which cooperates with said first flange and screw threads within said third aperture to engage the threads external to said receiving pipe, whereby rotation of said tightening means about said third axis draws said supply pipe toward said receiving pipe;
 said second aperture through said receiving pipe having a diameter substantially equal to the second diameter of the aperture through said formed extremity;
 said adapter having an enlarged head portion and a sleeve portion, a fourth longitudinal axis and a fourth aperture therethrough along said fourth axis;
 said adapted being comprised of a polymerized olefinic material deformable under pressure;
 said sleeve portion being fitted into said formed extremity and having a cylindrical peripheral surface of a diameter closely approximating the said second interior diameter of said formed extremity; said head portion being joined to said sleeve portion by a tapered neck portion which seats against said junction portion; said neck portion being inclined at said first angle;
 said head portion being gradually increasingly tapered narrower away from said sleeve portion;
 said head portion fitting against said seating surface of said receiving pipe; said seating surface being tapered complementary to said head portion;
 said first, second third and fourth longitudinal axes becoming substantially coaxial and said adapter deforming into sealing relationship with said first flange and said receiving pipe adapter seating surface as said tightening means is operated to draw said supply pipe toward said receiving pipe.

2. A joint for connecting a fluid supply pipe to a fluid receiving pipe as set forth in claim 1 where an outside washer is positioned between said tightening means and the flange on said formed extremity, said outside washer having a tapered surface complementary to the lower surface of said flattened junction portion to provide a flush contact therebetween.

3. A joint for connecting a fluid supply pipe to a fluid receiving pipe as set forth in claim 1 where said second aperature through said receiving pipe is of a diameter greater than the aperture through the formed extremity of said supply pipe and an outside washer is positioned between said tightening means and the flange on said formed extremity, said outside washer having a tapered surface complementary to the lower surface of said flattened junction portion to provide a flush contact therebetween.

4. A joint for connecting a fluid supply pipe to a fluid receiving pipe, comprising:
 a formed extremity on said supply pipe, an adapter and a tightening means;
 said supply pipe having an end, a first longitudinal axis and a first aperture through it along said first longitudinal axis;
 said formed extremity being adjacent the said end of said supply pipe; said supply pipe having a first interior diameter substantially along its entire length; said formed extremity having a second interior diameter greater than said first diameter; a tapered portion of said supply pipe joining said supply pipe with said formed extremity;
 a flattened junction portion at said end of said supply pipe which is inclined at a first acute angle from said first longitudinal axis;
 a flange extending generally perpendicular to said first longitudinal axis and meeting said supply pipe at said junction portion;
 said formed extremity and said flange being composed of a rigid material;
 said receiving pipe having an adapted seating surface at its end, a second longitudinal axis, a second aperture through it along said second longitudinal axis and an exterior surface which is threaded near its said end;
 said tightening means having a third longitudinal axis, a third aperture therethrough along said third axis, a second flange which cooperates with said first flange and screw threads within said third aperture to engage the threads external to said receiving pipe, whereby rotation of said tightening means about said third axis draws said supply pipe toward said receiving pipe;
 said second aperture through said receiving pipe having a diameter greater than the second diameter of the aperture through said formed extremity;
 said adapter having an enlarged head portion and a sleeve portion, a fourth longitudinal axis and a fourth aperture therethrough along said fourth axis;
 said adapter being comprised of a polymerized olefinic material deformable under pressure;
 said sleeve portion being fitted into said formed extremity and having a cylindrical peripheral surface of a diameter closely approximating the said second interior diameter of said formed extremity; said head portion being joined to said sleeve portion by a tapered neck portion which seats against said junction portion; said neck portion being inclined at said first angle;
 said head portion being gradually increasingly tapered narrower away from said sleeve portion;

said head portion fitting against said seating surface of said receiving pipe;

said first, second, third and fourth longitudinal axes becoming substantially coaxial and said adapter deforming into sealing relationship with said first flange and said receiving pipe adapter seating surface as said tightening means is operated to draw said supply pipe toward said receiving pipe.

No references cited.

CARL W. TOMLIN, *Primary Examiner.*

THOMAS F. CALLAGHAN, *Examiner.*